US007817781B2

(12) United States Patent
Wraight et al.

(10) Patent No.: US 7,817,781 B2
(45) **Date of Patent: *Oct. 19, 2010**

(54) HIGH VOLTAGE X-RAY GENERATOR AND RELATED OIL WELL FORMATION ANALYSIS

(75) Inventors: Peter Wraight, Skillman, NJ (US); Arthur J. Becker, Ridgefield, CT (US); Joel L. Groves, Leonia, NJ (US); Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 39 days.

This patent is subject to a terminal disclaimer.

(21) Appl. No.: 12/503,517

(22) Filed: Jul. 15, 2009

(65) Prior Publication Data

US 2009/0274276 A1 Nov. 5, 2009

Related U.S. Application Data

(63) Continuation of application No. 11/611,441, filed on Dec. 15, 2006, now Pat. No. 7,564,948.

(51) Int. Cl.
*G21G 4/00* (2006.01)
*G01B 15/02* (2006.01)

(52) U.S. Cl. ........................................ 378/119; 378/54

(58) Field of Classification Search ................... 378/89, 378/95, 101, 111, 121, 119, 54
See application file for complete search history.

(56) References Cited

U.S. PATENT DOCUMENTS

| | | | |
|---|---|---|---|
| 3,239,706 A | 3/1966 | Sherman et al. | |
| 3,654,470 A * | 4/1972 | Wilson | 250/268 |
| 3,766,391 A | 10/1973 | Siedband et al. | |
| 5,680,431 A | 10/1997 | Pietras, III et al. | |
| 5,736,636 A | 4/1998 | Mozelev et al. | |
| 5,804,820 A | 9/1998 | Evans et al. | |
| 5,910,654 A | 6/1999 | Becker et al. | |
| 7,073,378 B2 | 7/2006 | Smits et al. | |
| 7,285,772 B2 | 10/2007 | Labous et al. | |
| 7,334,465 B2 | 2/2008 | Smits et al. | |
| 2005/0018817 A1 | 1/2005 | Oettinger et al. | |
| 2007/0041501 A1 | 2/2007 | Ramstad et al. | |

FOREIGN PATENT DOCUMENTS

| | | |
|---|---|---|
| WO | WO2008063075 | 5/2008 |
| WO | WO2008066391 | 6/2008 |
| WO | WO2008069674 | 6/2008 |

* cited by examiner

*Primary Examiner*—Irakli Kiknadze
(74) *Attorney, Agent, or Firm*—Darla Fonseca; Jonna Flores; Charlotte Rutherford

(57) ABSTRACT

An apparatus and method for determining the density and other properties of a formation surrounding a borehole using a high voltage x-ray generator. One embodiment comprises a stable compact x-ray generator capable of providing radiation with energy of 250 keV and higher while operating at temperatures equal to or greater than 125° C. In another embodiment, radiation is passed from an x-ray generator into the formation; reflected radiation is detected by a short spaced radiation detector and a long spaced radiation detector. The output of these detectors is then used to determine the density of the formation. In one embodiment, a reference radiation detector monitors a filtered radiation signal. The output of this detector is used to control at least one of the acceleration voltage and beam current of the x-ray generator.

13 Claims, 17 Drawing Sheets

1504

1502

HIGH VOLTAGE X-RAY GENERATOR AND RELATED OIL WELL FORMATION ANALYSIS

CROSS REFERENCE TO RELATED APPLICATIONS

This is a continuation of application Ser. No. 11/611,441 filed Dec. 15, 2006.

BACKGROUND

This disclosure relates to an apparatus and method for evaluating a formation surrounding a borehole using an x-ray generator. More specifically, this disclosure relates to a system for using x-rays to determine the density of the formation. The measurements are taken using a downhole tool comprising an x-ray generator and a plurality of radiation detectors. The x-ray generator is capable of emitting radiation with high enough energy to pass into the formation and allow for substantive analysis of radiation reflected and received at the plurality of radiation detectors. In one embodiment, a reference radiation detector is used to control the acceleration voltage and beam current of the x-ray generator.

Well logging instruments utilizing gamma ray sources and gamma detectors for obtaining indications of the density and photoelectric effect ($P_e$) of the formation surrounding a borehole are known. A typical device comprises a long sonde body containing a gamma ray radioisotopic source and at least one gamma ray detector separated by a predetermined length. The sonde must be as short as possible to avoid distortion due to irregularities in the wall of the borehole that would cause a longer sonde to stand away from the actual formation surface. Distortion also is caused by the mudcake that often remains on the wall of the borehole through which any radiation must pass. These problems must be addressed by any system with the purpose of determining the density of the formation.

The radioisotopic sources used in the past include cesium ($^{137}Ce$), barium ($^{133}Ba$), and cobalt ($^{57}Co$) among others. The basic measurement is the response seen at a radiation detector when radiation is passed from the radioisotopic source into the formation. Some radiation will be lost, but some will be scattered and reflect back toward the detectors, this reflected radiation is useful in determining properties of the formation.

While this radioisotope source type of system can provide an accurate result, there are drawbacks to the use of a chemical source such as $^{137}Cs$ in measurements in the field. Any radioactive source carries high liability and strict operating requirements. These operational issues with chemical sources have led to a desire to utilize a safer radiation source. Although the chemical sources do introduce some difficulties, they also have some significant advantages. Specifically, the degradation of their output radiation over time is stable allowing them to provide a highly predictable radiation signal. An electrical photon (radiation) generator would alleviate some of these concerns, but most electrical photon generators (such as x-ray generators) are subject to issues such as voltage and beam current fluctuation. If these fluctuations can be controlled, this would provide a highly desirable radiation source.

Prior systems have attempted to use low energy x-rays to determine formation density. Photons with energy less than 250 keV are unlikely to be scattered back and received by the tools radiation detectors. If a tube operating below 250 kV is used, the electron current required will typically be too great to produce density measurements with reasonable efficiency. Additionally, at energies of 300 keV and greater, the interaction with the formation is dominated by Compton Scattering. This type of interaction is desirable in the calculations required to determine the bulk density of the formation from the measurement of attenuated radiation.

Accordingly, a need has been identified for a tool that may be used to determine formation density downhole. The photon generator used must be stable over time with its parameters closely controlled to ensure accurate measurements regardless of changing conditions. The photon generator must be capable of providing significant amounts of radiation consistently with energies at or above 250 keV.

BRIEF SUMMARY OF THE INVENTION

In consequence of the background discussed above, and other factors that are known in the field, applicants recognized a need for an apparatus and method for determining properties of the formation surrounding a borehole in a well services environment. Applicants recognized that a high voltage x-ray generator with a carefully controlled acceleration voltage and beam current could be used along with one or more radiation detectors to provide a reliable measure of the characteristics of a formation surrounding a borehole.

One embodiment comprises a compact x-ray generator comprising an electron emitter, a target, and a power supply. The x-ray generator provides radiation with energy greater than or equal to 250 keV. The x-ray generator operates at temperatures greater than or equal to 125° C.

One embodiment comprises an x-ray generator providing input radiation that is reflected to some extent by the formation material. The resultant radiation is measured by two radiation detectors spaced two different distances from the point at which radiation is introduced to the formation. Using the output of these detectors a density of the formation is determined. It is also possible to determine the $P_e$ of the formation using this information.

In another embodiment, the radiation output by the x-ray generator is filtered to produce a radiation spectrum with a high energy region and a low energy region, this spectrum is introduced to a reference radiation detector. The output of this radiation detector is used to control the acceleration voltage and beam current of the x-ray generator.

THE DRAWINGS

The accompanying drawings illustrate embodiments of the present invention and are a part of the specification. Together with the following description, the drawings demonstrate and explain principles of the present invention.

DETAILED DESCRIPTION

Figure 1:
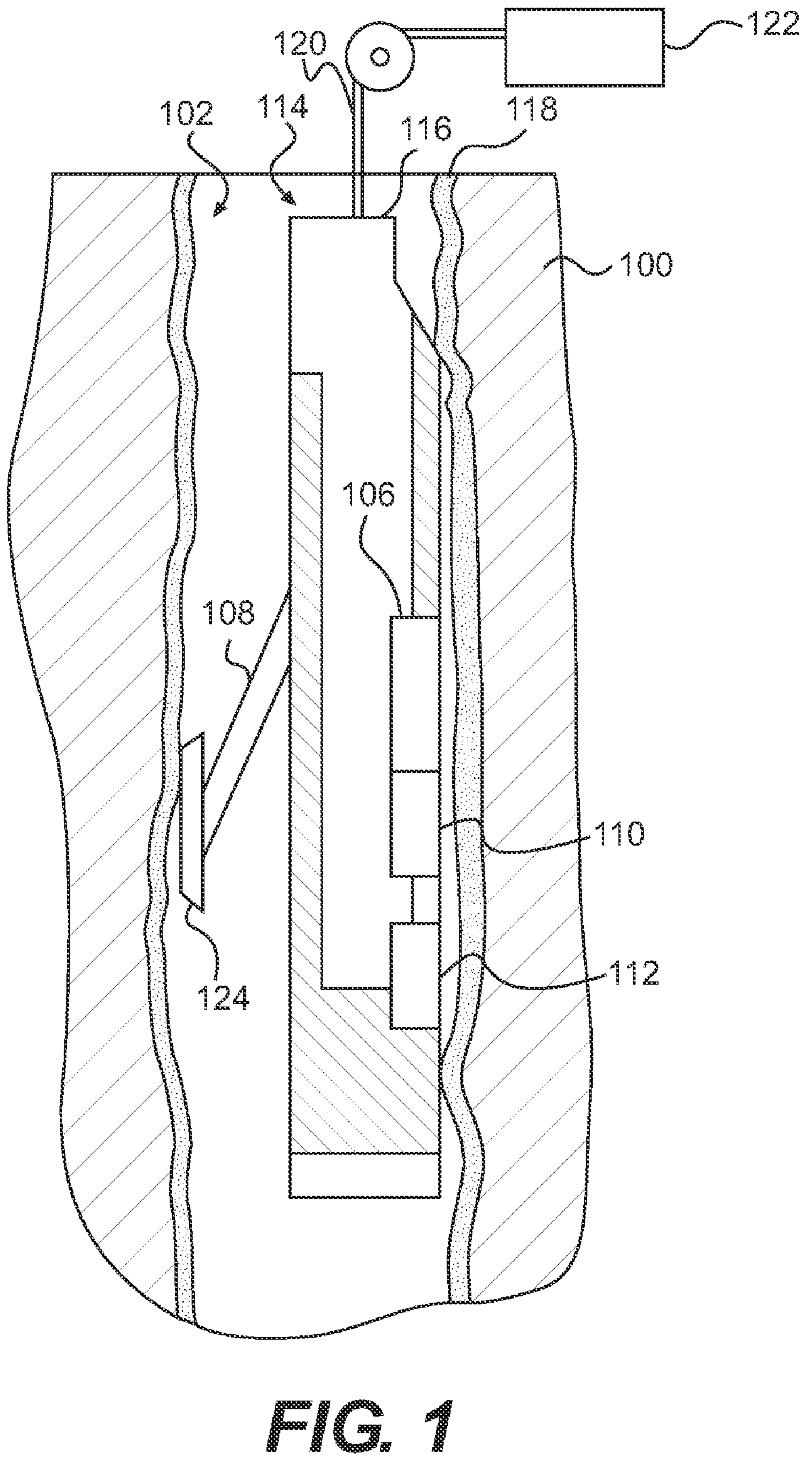
FIG. 1 is a schematic view of the operational context in which the present apparatus and method can be used to advantage.

Referring now to the drawings and particularly to FIG. 1 wherein like numerals indicate like parts, there is shown a schematic illustration of an operational context of the instant invention. This figure shows one example of an application of the invention for determining the density and other properties of the formation surrounding a borehole 102. As described above, the tool 114 is positioned downhole to determine properties of formation 100 using input radiation that is subsequently detected.

In the embodiment of FIG. 1, tool 114 comprises sonde body 116 that houses all components that are lowered into borehole 102. X-ray generator 112 introduces radiation into formation 100. This radiation is to some extent scattered from different depths in the formation 100 and the resultant radiation signal is detected at short spaced detector 110 and long spaced detector 106.

During the drilling process, the borehole may be filled with drilling mud. The liquid portion of the drilling mud flows into the formation leaving behind a deposited layer of solid mud materials on the interior wall of the borehole in the form of mudcake 118. For reasons described below, it is important to position the x-ray generator 112 and detectors 106 and 110 as close to the borehole wall as possible for taking measurements. Irregularities in the wall of the borehole will create more a problem as the sonde body becomes longer, so it is desirable to keep the entire tool as short in length as possible. Sonde body 116 is lowered into position and then secured against the borehole wall through the use of arm 108 and securing skid 124. Tool 114, in one embodiment, is lowered into the borehole 102 via wireline 120. Data is passed back to analysis unit 122 for determination of formation properties. This type of tool is useful downhole for wireline, logging-while-drilling (LWD), measurement-while-drilling (MWD), production logging, and permanent formation monitoring applications.

X-Ray Physics

X-ray tubes produce x-rays by accelerating electrons into a target via a high positive voltage difference between the target and electron source. The target is sufficiently thick to stop all the incident electrons. In the energy range of interest, the two mechanisms that contribute to the production of x-ray photons in the process of stopping the electrons are X-ray fluorescence and Bremsstrahlung radiation.

X-ray fluorescence radiation is the characteristic x-ray spectrum produced following the ejection of an electron from an atom. Incident electrons with kinetic energies greater than the binding energy of electrons in a target atom can transfer some (Compton Effect) or all (Photoelectric Effect) of the incident kinetic energy to one or more of the bound electrons in the target atoms thereby ejecting the electron from the atom.

If an electron is ejected from the innermost atomic shell (K-Shell), then characteristic K, L, M and other x-rays are produced. K x-rays are given off when an electron is inserted from a higher level shell into the K-Shell and are the most energetic fluorescence radiation given off by an atom. If an electron is ejected from an outer shell (L, M, etc.) then that type of x-ray is generated. In most cases, the L and M x-rays are so low in energy that they cannot penetrate the window of the x-ray tube. In order to eject these K-Shell electrons, an input of more than 80 kV is required in the case of a gold (Au) target due to their binding energy.

Another type of radiation is Bremsstrahlung radiation. This is produced during the deceleration of an electron in a strong electric field. An energetic electron entering a solid target encounters strong electric fields due to the other electrons present in the target. The incident electron is decelerated until it has lost all of its kinetic energy. A continuous photon energy spectrum is produced when summed over many decelerated electrons. The maximum photon energy is equal to the total kinetic energy of the energetic electron. The minimum photon energy in the observed Bremsstrahlung spectrum is that of photons just able to penetrate the window material of the x-ray tube.

The efficiency of converting the kinetic energy of the accelerated electrons into the production of photons is a function of the accelerating voltage. The mean energy per x-ray photon increases as the electron accelerating voltage increases.

A Bremsstrahlung spectrum can be altered using a filter and by changing (1) the composition of the filter, (2) the thickness of the filter, and (3) the operating voltage of the x-ray tube. The embodiment described herein utilizes a single filter to create low and high energy peaks from the same Bremsstrahlung spectrum. Specifically, a filter is used to provide a single spectrum with a low energy peak and a high energy peak.

High Voltage X-Ray Generator

In order to replace prior art radiochemical sources, a high voltage x-ray generator is required as described above. One difficulty addressed in this invention is the size of the x-ray generator. Another difficulty is the requirement that the generator operate at temperatures greater than or equal to 125° C. The generator must be small enough to be housed in the downhole tool and still allow minimal impact of curvature in the borehole wall.

Figure 2:
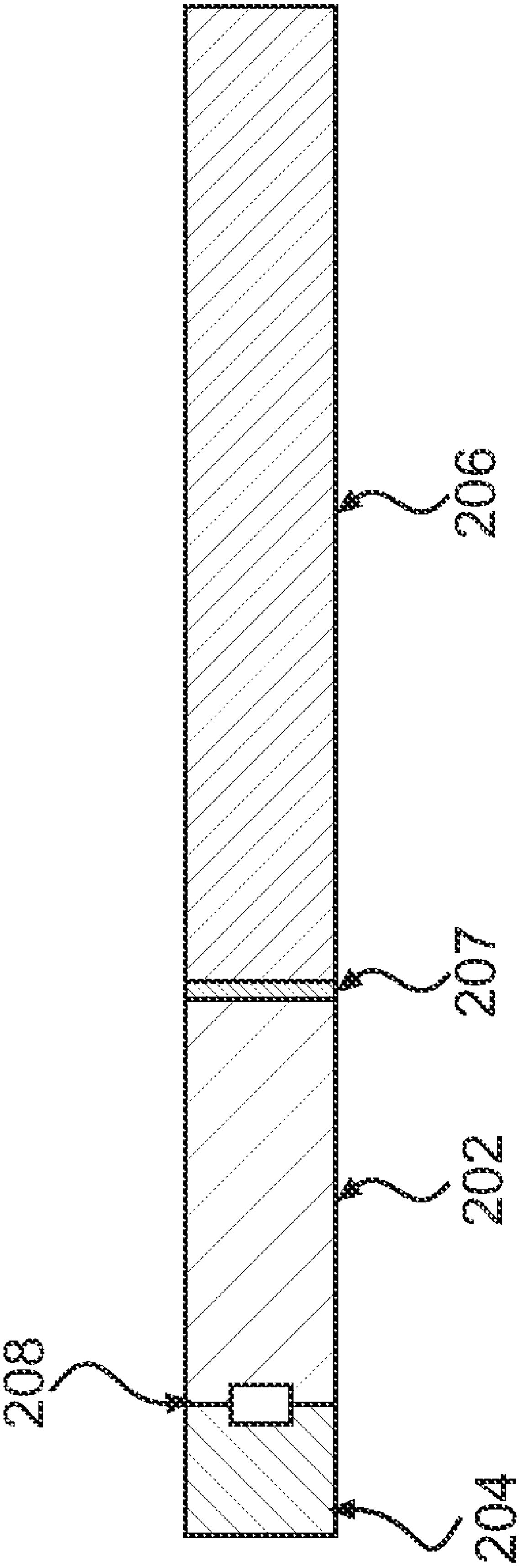
FIG. 2 is a block diagram of an x-ray generator that may be used in the instant invention.

While it has been shown that a high voltage x-ray generator can produce high enough energy radiation to be useful in the determination of formation density, this x-ray generator must be compact in size in order to be useful downhole. FIG. 2 is a block diagram of the x-ray tube that is useful in this system. In one embodiment, the x-ray tube chosen is a heated cathode type. X-ray tube 202 is powered by high voltage generators 204 and 206. It is desired in one embodiment to achieve at least a 250 kV voltage difference between the electron emitter (heated cathode) 207 and the target 208. In one embodiment, the target 208 is gold (Au). Voltage generator 204 applies a negative voltage to the electron emitter while a voltage generator 206 applies a positive voltage to the target. These voltage values are selected to give a total voltage drop of greater than or equal to 250 kV. As will be shown below, using this configuration allows for a decrease in the overall length of the voltage generator making it more useful downhole.

In one embodiment, Cockcroft Walton type high voltage generators are used. As will be shown, these generators can be effectively folded in an arrangement to greatly decrease the length of the tool as shown below. A Cockroft-Walton voltage generator is a voltage ladder that converts AC or pulsing DC power from a low voltage level to a higher DC voltage level. It is generally constructed of sets of capacitors and diodes that generate the necessary voltage. This structure allows the voltage generator to provide a high voltage without the increased size associated with transformers.

Figure 3:
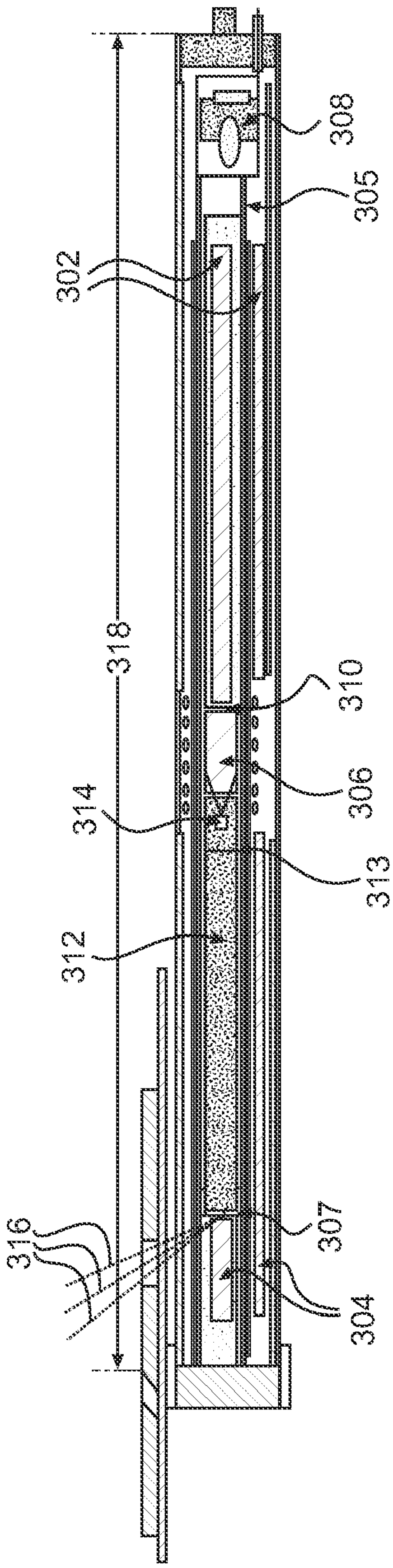
FIG. 3 is a detailed schematic representation of one embodiment of the x-ray generator that may be used in the instant invention.

FIG. 3 is a detailed representation of the x-ray tube that is used in one embodiment of this invention. This is a 400 kV x-ray generator that utilizes the Cockcroft-Walton voltage generators described in order to provide the highest energy radiation in a small enough space to allow for maximum contact with the formation wall. High voltage generator 302 is folded wherein one portion of the ladder runs along the outside of Teflon housing 305 and the other portion of the ladder runs inside the housing. Generator 302 creates a high voltage and the negative potential terminal is connected to the electron emitter 314 with the positive potential terminal connected to ground. High voltage generator 304 is also folded to minimize the length of the overall tube. The number of ladder stages for generators 402 and 404 that are placed outside the Teflon housing 305 and inside the Teflon housing will vary depending on size constraints. The positive potential terminal of voltage generator 304 is connected to the target 307. In one embodiment, as mentioned above, this target is gold (Au). High Voltage transformer 308 provides an input to each of the high voltage generators 302 and 304. Isolation transformer 306 comprises two secondary outputs that provide the input voltage required to generate and direct electrons down the length of the x-ray tube. This isolation transformer provides a lower voltage to heated cathode 314 and to a grid (not pictured) to facilitate acceleration of electrons down the length 312 of the x-ray tube. As electrons collide with target 307, radiation 316 is created and emitted from the opening in the shielding of the generator.

The x-ray tube used in one embodiment is a heated cathode type x-ray tube. Cathode 314 is operable to release electrons in response to exposure to heat. A high voltage generator applies a high negative voltage to cathode 314. The introduction of current (~2 amps) and voltage (~2V) heats the cathode 314 and causes it to release electrons. A higher voltage (~200V) is applied to grid 313 that is operable to move electrons released from cathode 314 toward electron accelerating section 312. In one embodiment, this grid 313 is made of Nickel (Ni). Accelerating section 312 speeds electrons toward target 307. Upon collision with target 307, radiation 316 is emitted.

Figure 4:
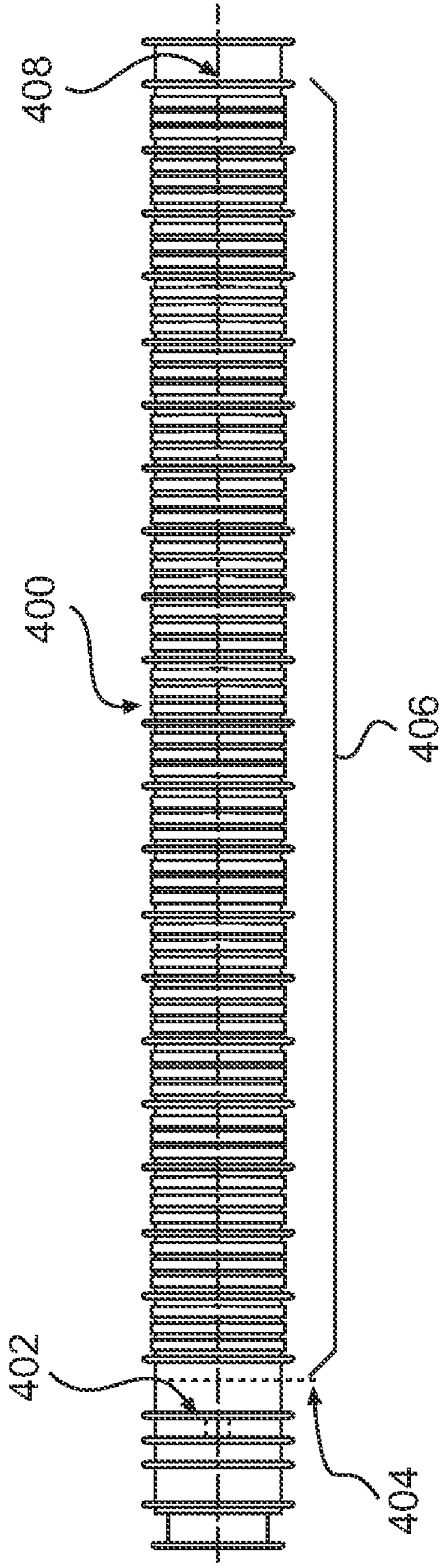
FIG. 4 is a schematic representation of an x-ray tube that is used in one embodiment of the invention.

FIG. 4 is a more detailed view of the heated cathode type x-ray tube 400 that is used in one embodiment. Cathode 402 is heated and releases electrons that are directed by grid 404. Accelerating section 406 speeds the electrons toward target 408 producing radiation to be passed into the formation.

Figure 5:
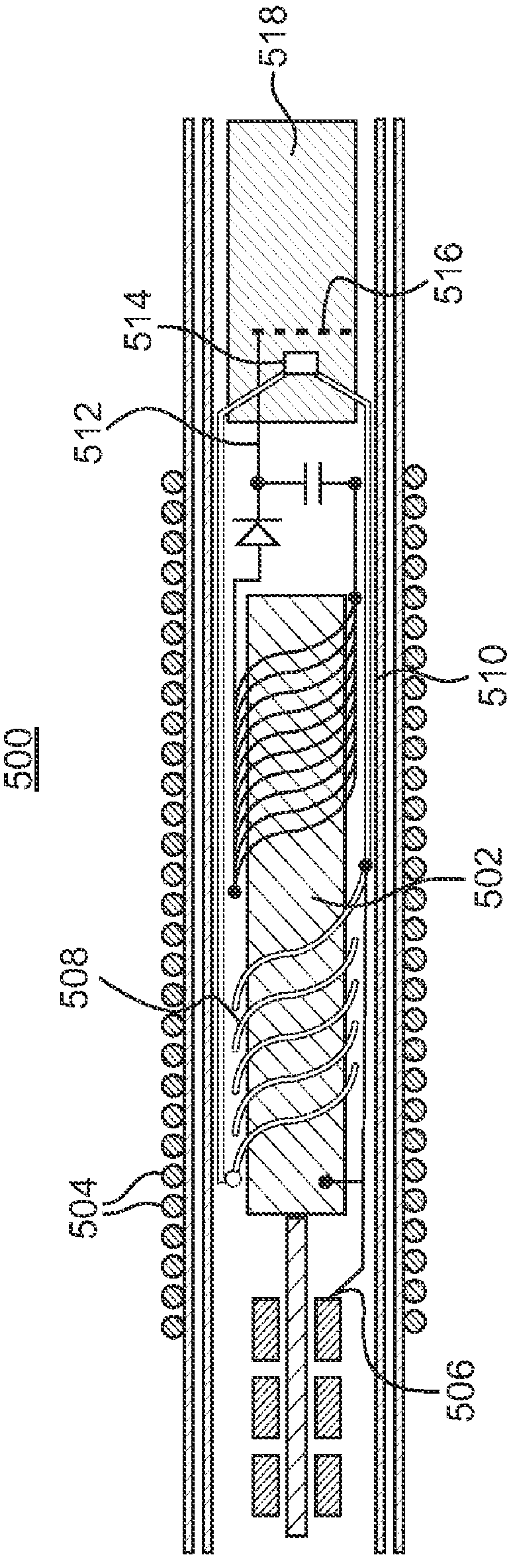
FIG. 5 is a schematic representation of an isolation transformer that is used in one embodiment of the invention.

FIG. 5 is a detailed schematic of the isolation transformer mentioned above. Primary winding 504 is separated from ferrite core 502 and the secondary windings by the Teflon sleeve 510. This sleeve 510 may comprise a plurality of tubular Teflon elements. A high negative voltage is acquired from the high voltage generator described above at point 506 and supplied to the ferrite core 502 and one of the secondary windings 508 and 510. Secondary winding 508 provides approximately 2V at 2 A to the hot cathode 514. Secondary winding 512 provides approximately 200V DC at 1-2 mA to the grid 516. This will cause the movement of electrons from the cathode 514 down x-ray tube 518.

Figure 6:
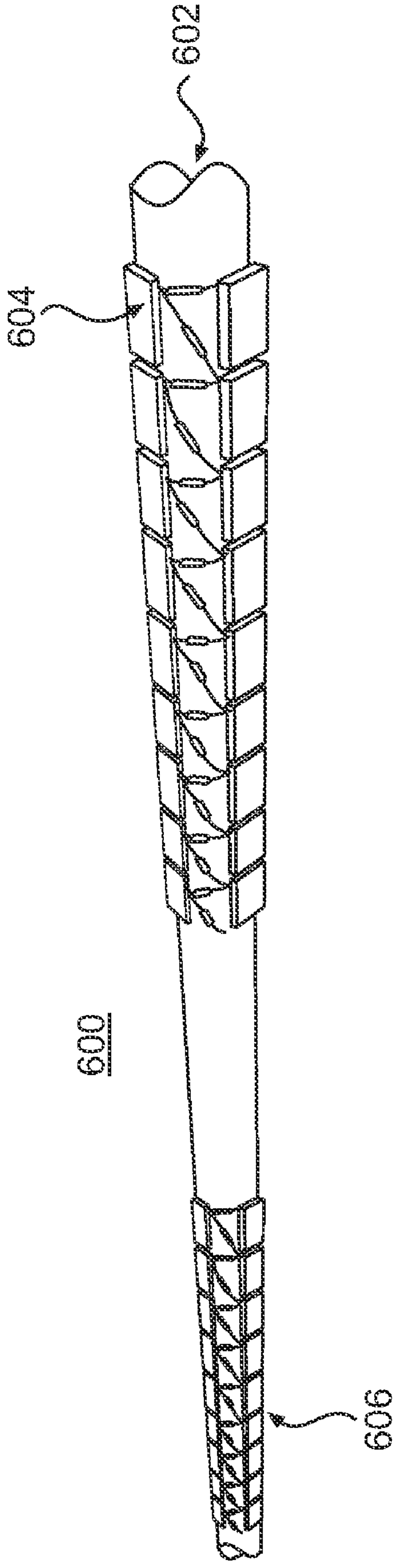
FIG. 6 is a detailed schematic of the outer surface of one embodiment of the invention utilizing a voltage ladder.

FIG. 6 is a pictorial view of the tool 600 before it is inserted into its outer housing. Inner housing 602 contains the x-ray tube and a portion of the high voltage ladder 604. Shown here is the portion of the voltage ladder 604 that is placed on the outside of the inner housing. By placing this portion on the outside of the housing and the rest of the ladder on the inside, the overall length of the tool is decreased substantially. On the opposite end of the inner housing, voltage ladder 606 is also arranged in a similar manner to put a portion of it on the outside of the inner housing and the rest on the inside of the inner housing.

Note that this is a description of the tool before it is placed in an operational scenario. In one embodiment, the tool of FIG. 6 is inserted into Teflon housing. This is then placed in a steel housing that is covered in a titanium housing before being placed downhole. The signal from the x-ray generator will be attenuated to some extent by these different housings, but the radiation level is chosen such that this attenuation is not detrimental to the determination of formation density.

The materials used to construct the x-ray generator are selected and constructed in such a manner to allow the generator to function at high temperatures. This is important given the environment downhole. One embodiment of the present invention operates at temperatures equal to and greater than 125° C. The selected isolators, capacitors, and transformer materials are all capable of operation at these high temperatures. Further, the Teflon housing is selected to be less susceptible to the high temperatures encountered downhole.

Determination of Formation Density

The density of a material can be determined by analyzing the attenuation of x-rays passed through and reflected from the material. The initial measurement to be found is not the mass density, ρ, that will be the eventual product, but the electron density index, $\rho_e$, of the material. The electron density index is related to the mass density by the definition $$\rho_e = \frac{2 \cdot Z}{A} \rho$$

The attenuation of a beam of x-rays of energy E, intensity $I_0(E)$, passing through a thickness ‘d’ of material with a electron density index ‘$\rho_e$’ can be written $$I(E) = I_0(E) e^{-\frac{\mu_m(E) \rho_e A d}{2Z}}$$

where any interaction of the photons traversing the material attenuates the beam. Here, $\mu_m(E)$ is the mass attenuation coefficient of the material. It is important to note that this mass attenuation coefficient is variable depending on the type of matter that is present. I(E) in the previous equation does not include the detection of photons created following photoelectric absorption or multiple scattered photons.

The earliest systems for determining the formation density utilized a single radiation detector. Due to intervening mudcake, more modern devices use two detectors in a housing that shields them from direct radiation from the source. The responses of these two detectors are used to compensate for the effect of the intervening mudcake in a process that will be described in detail below. As shown in FIG. 1, these detectors are separated, one being a short spaced detector and the other being a long spaced detector. The short spaced detector has a lower density sensitivity than the long spaced detector because for a given change in density, the count rate of the short spaced detector will have a smaller fractional change than the long spaced detector. With no mudcake, the formation electron density index could be found by looking at the response of either detector individually. However, in most cases, mudcake is present and the apparent electron density indexes of the two detectors will be different and can be used to settle on one correct formation electron density index as described below.

The actual effect of mudcake on the response of the detectors can cause the determination of an apparent electron density index at each detector that is either higher or lower than the electron density index of the formation. If the formation electron density index, $\rho e_b$ is fixed, a mudcake electron density index less than the value of $\rho e_b$ will result in an overall low determination of bulk electron density index due to higher count rates at each detector. The reverse occurs if the electron density index of the mudcake is greater than the formation electron density index. In that instance, the count rates of each detector will decrease and the apparent electron density index will be higher. Due to all this, a correction is required in the calculation of formation electron density index and will be detailed below.

Depth of penetration of radiation is an important factor in determining the density of a formation. When a radiochemical source like Cesium is replaced with an X-ray generator, the far spaced detector must retain at least the same depth of investigation to ensure a similarly accurate measurement. For a given detector spacing, the investigation depth will depend on the X-ray generator's source energy and on the angle of incidence of flux entering the formation.

Figure 7:
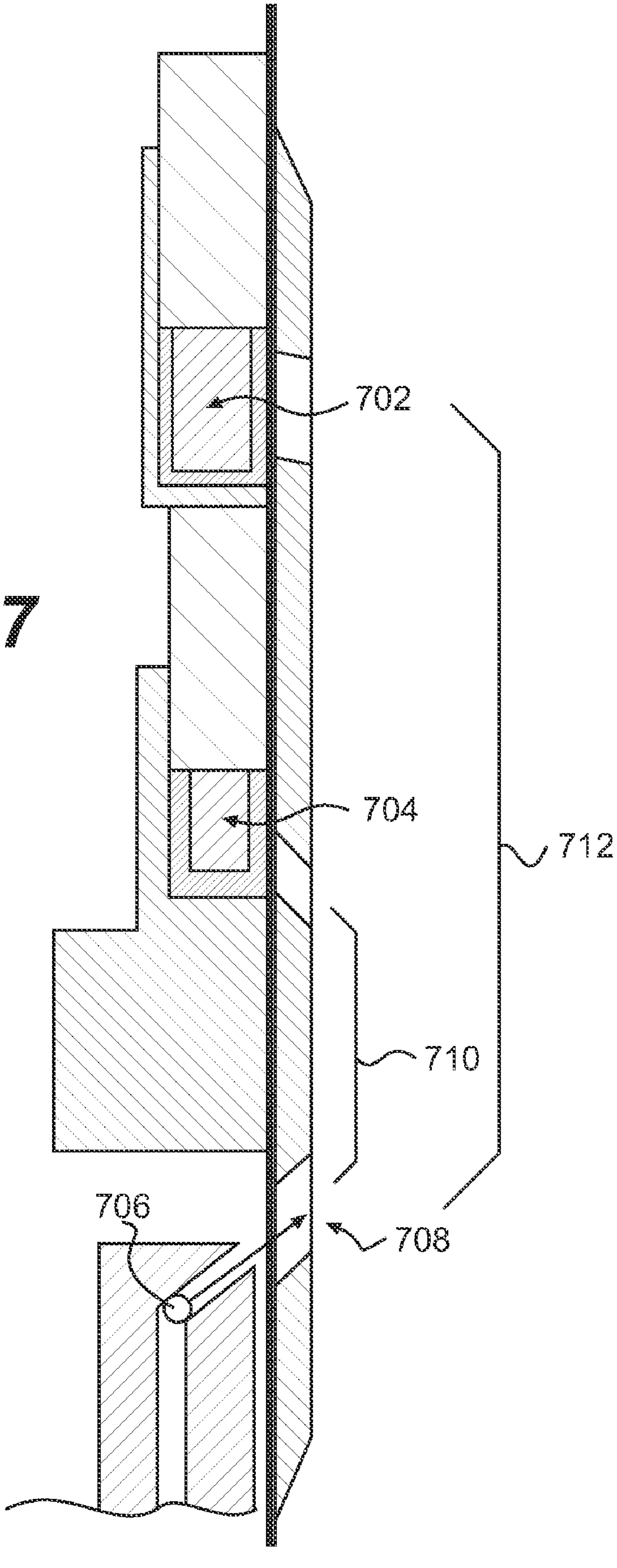
FIG. 7 is a schematic representation of the source/detector architecture in one embodiment of the present invention.

Based on prior testing, it is desired to provide a high voltage X-ray generator that produces significant energy above 250 keV. This is the x-ray generator that was described above. This energy level will allow for determination of formation electron density index when its output is used in the analysis method described below. FIG. 7 is an illustration of one embodiment of the overall structure of the tool that would be positioned downhole. X-ray target 706 is the origination point for radiation 708 that is passed into the formation. Short spaced detector 704 is positioned a distance 710 from the point at which radiation 708 is introduced to the formation. Long spaced detector 702 is positioned a distance 712 from the point at which radiation 708 is introduced to the formation. In one embodiment, distance 710 is approximately 3.5" and distance 712 is approximately 9.5". However, it is important to note that this spacing may change to optimize the response and depth of investigation. Shielding 714 ensures that no radiation is leaked and that no radiation is introduced directly from the x-ray generator to the radiation detectors. A tungsten cover may be used to provide this shielding. The detectors used in this embodiment may be the type described in U.S. patent application Ser. No. 11/312,841 entitled "Method and Apparatus for Radiation Detection in a High Temperature Environment." This application is assigned to Schlumberger Technology Corporation and is hereby incorporated by reference as though set forth in length. In this figure, also note that the x-ray output has a window to allow for the release of radiation toward the formation and both detectors 704 and 702 have windows to allow reflected radiation to enter. These windows are angled to provide for maximum depth of penetration and depth of sensitivity.

Figure 8:
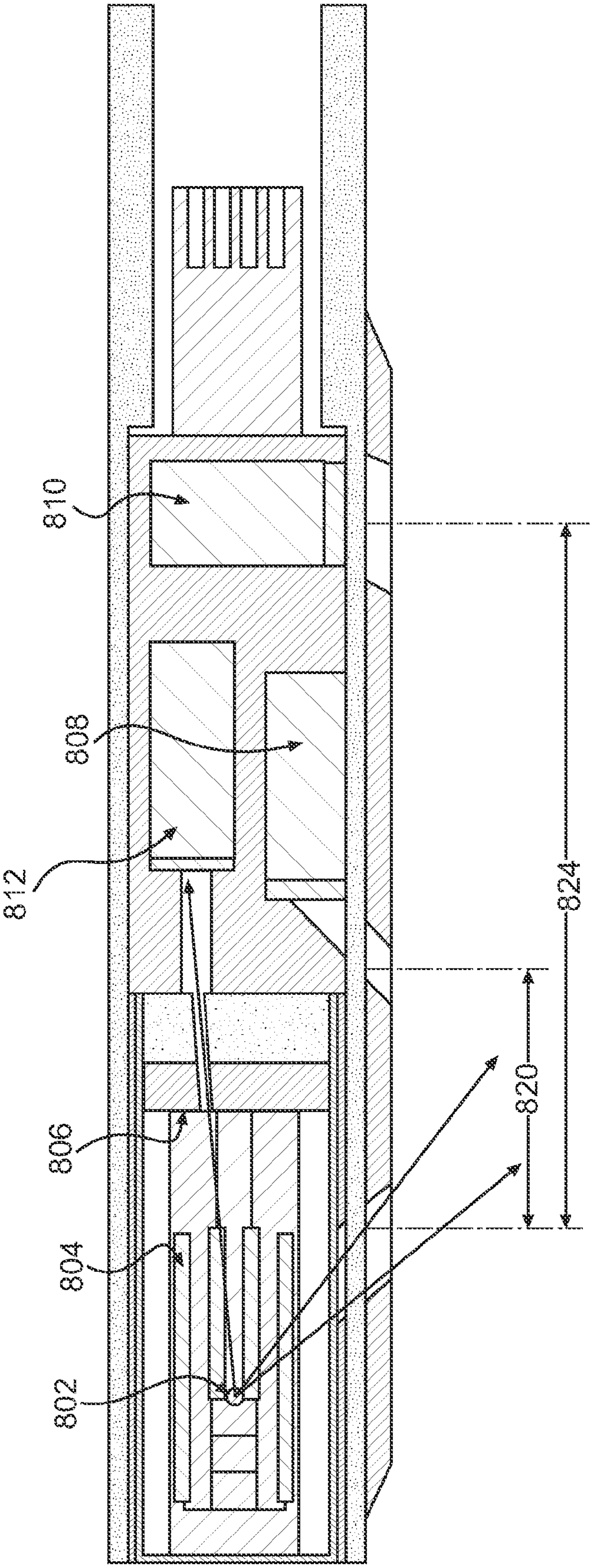
FIG. 8 is a detailed schematic representation of one embodiment of the present invention using a reference detector.

FIG. 8 is a schematic representation of the overall structure of one embodiment of the present invention. This representation does not show the full x-ray tube described above. Target 802 emits radiation as described above. Voltage is applied by high voltage generator 804 as described above. Some of this radiation is directed toward the formation. The radiation that is reflected is monitored by short spaced detector 808 and long spaced detector 810. In addition to these detectors, reference detector 812 is used in one embodiment. Radiation directly output from the x-ray generator is passed through a filter 806 to create a dual peak spectrum with a high energy region and a low energy region. In one embodiment, the filter is lead (Pb) and both decreases the overall energy of the radiation and creates the two peak spectrum. The output of the reference detector is used to control the acceleration voltage and beam current of the x-ray generator as described below.

Radiation passes through windows that are angled to ensure the optimal angle of incidence as well as to allow for a maximum amount of radiation to be detected by detectors 808 and 810. In one embodiment, short spaced detector distance 820 is approximately 3.5" and long spaced detector spacing 824 is approximately 9.5".

Figure 9:
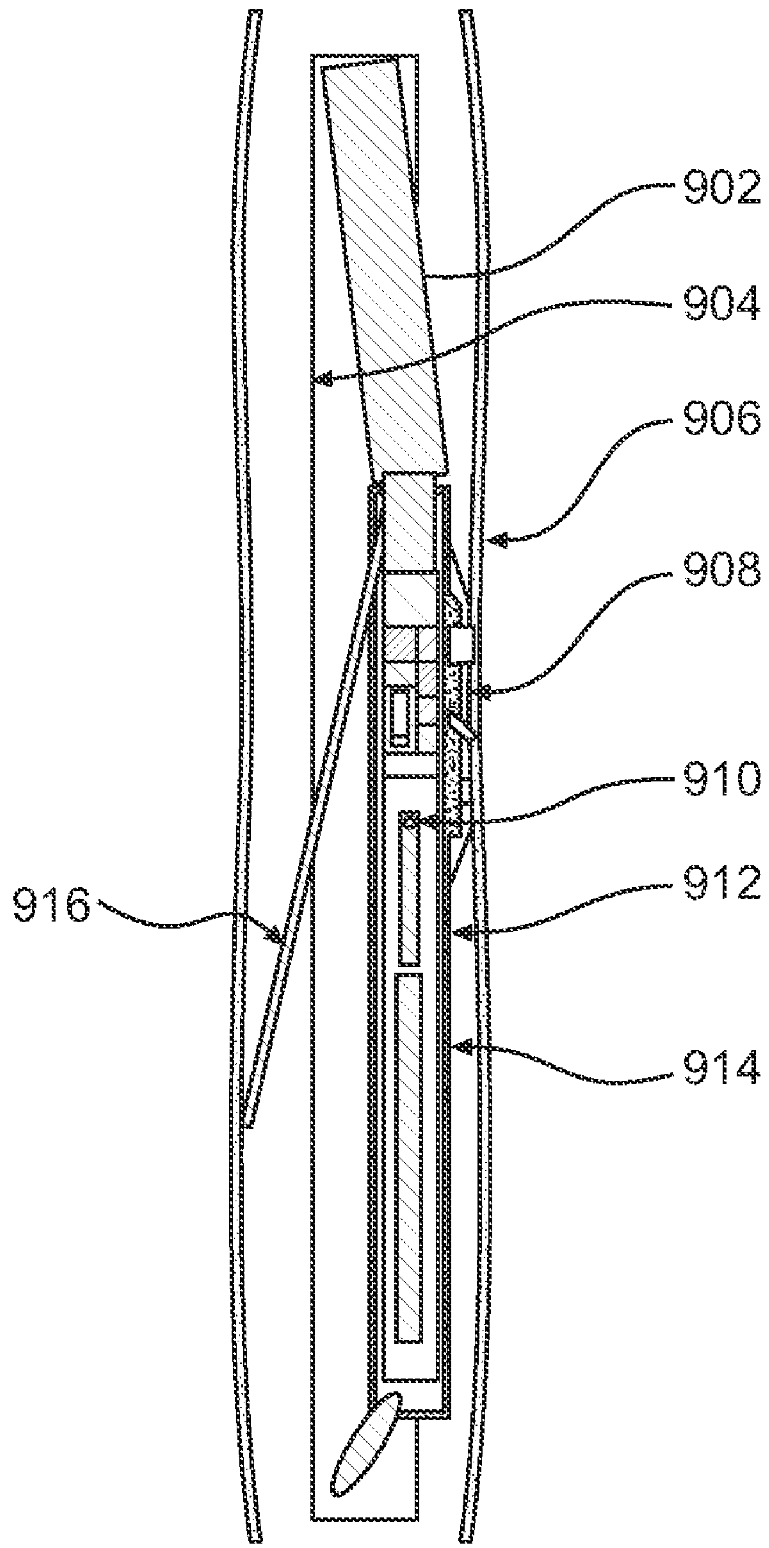
FIG. 9 is a schematic representation of one embodiment of the tool in use downhole.

FIG. 9 is one embodiment of the invention in an operation context to show the general orientation and placement of the elements. Hydraulic motor 902 operates to push arm 916 against the borehole wall to position the tool as close to the opposing side of the borehole wall 906 as possible. Trace 904 shows the outer diameter of the tool before it is extended against the borehole wall. Tungsten cover and wear plate 908 protects the front surface of the tool from damage due to repeated contact with the borehole wall. These plates also provide collimation for the radiation as will be described below. Titanium pressure vessel 912 houses the tool and the x-ray tube 914. Radiation is emitted from target 910 as described above. The detector configuration from FIG. 8 is illustrated.

Figure 10:
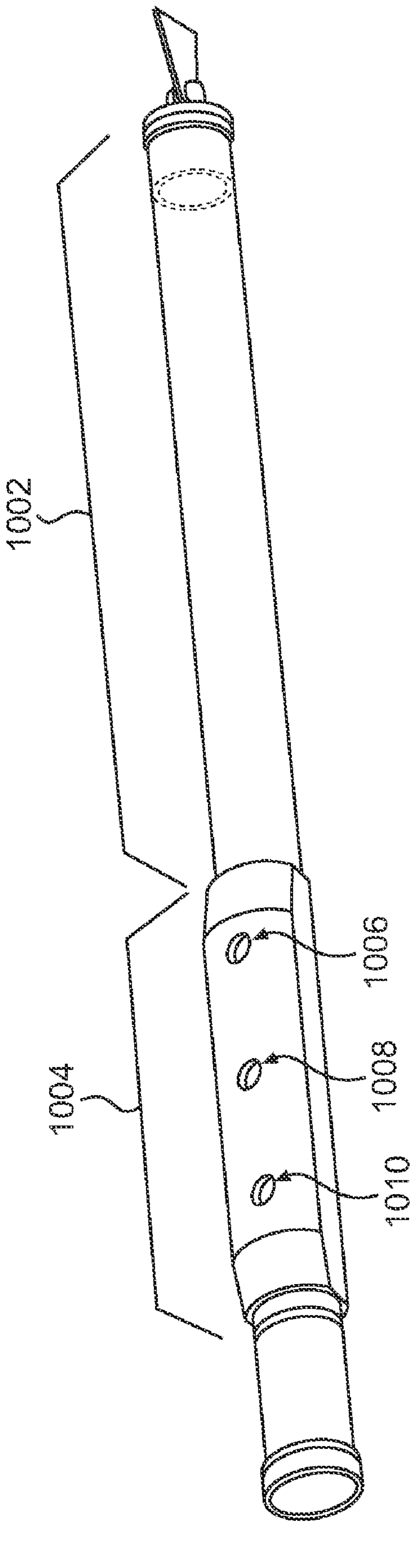
FIG. 10 is a schematic representation of the outer housing of one embodiment of the invention.

FIG. 10 is a detailed schematic of the outer surface of the tool that would be integrated in the sonde and positioned downhole. Section 1002 is primarily where the x-ray generator will be positioned and fully housed in the body. Section 1004 is where radiation is released into the formation and then received back into the short and far spaced radiation detectors. Radiation is released through window 1006 into the formation. The short spaced detector receives the resulting radiation via window 1008. The long spaced detector receives resulting radiation via window 1010. Note that windows 1006, 1008, and 1010 are angled to allow for maximum sensitivity and detected radiation. Also, window 1010 is larger than window 1008 to facilitate a better signal at the long spaced detector where attenuation will be greater.

Figure 11:
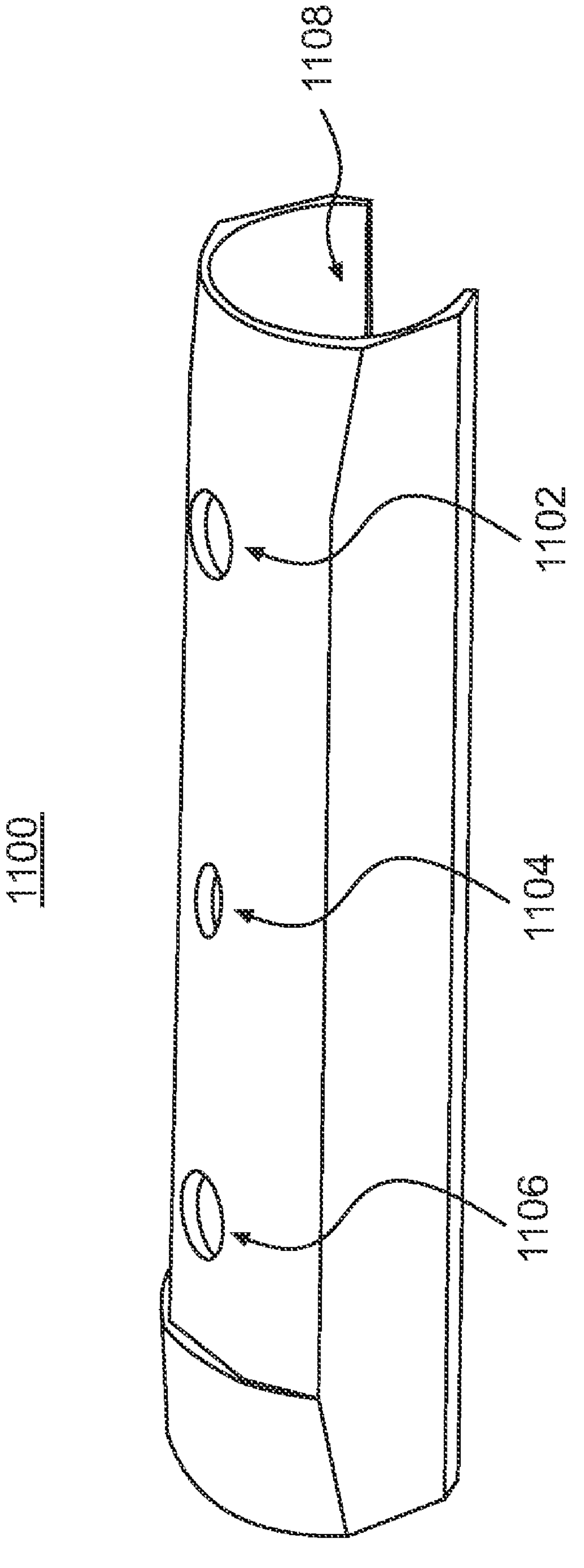
FIG. 11 is a schematic representation of a cover on the outer housing of one embodiment of the present invention.

FIG. 11 is a close view of the shoe that covers the tool and includes the windows described in relation to FIG. 10. Shoe 1100 covers the tool housing the x-ray generator by placing that part of the tool into space 1108. Radiation is emitted through window 1102 and received at the short and long spaced detectors through windows 1104 and 1106 respectively. Again, the difference in angle and hole diameter can be seen here. In one embodiment, the angle of window 1102 is between 45° and 60° and the angle of the window 1104 is between 30° and 45°. Each of windows 1102, 1104, and 1106 is filled with a substance such as epoxy that provides little interference with the passing of radiation. In one embodiment, this shoe is either constructed of, or covered by a layer of tungsten. This tungsten is very dense and prevents radiation from exiting or entering the device from any place other than the windows. This is important for the integrity of the measurement and the general safety level of the tool.

Figure 12:
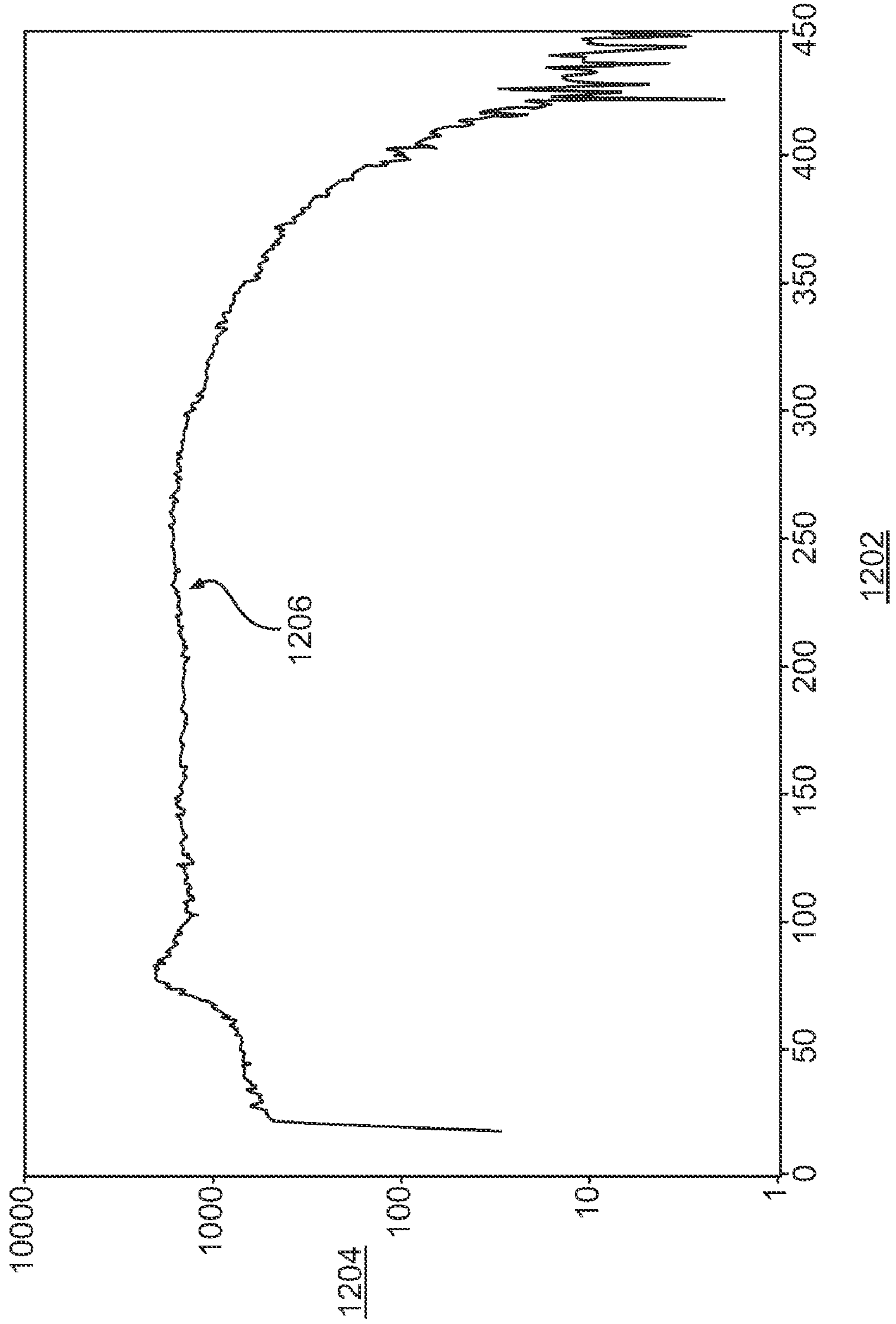
FIG. 12 is a graphical representation of the photon energy spectrum that may be produced by the x-ray generator in the instant invention.

As briefly described above, a use for this tool is to determine the density and $P_e$ of a formation surrounding a borehole. The radiation spectrum output by the x-ray generator and introduced to the formation is shown in FIG. 12. The abscissa 1202 is the energy of the radiation in measured in keV. Ordinate 1204 is the count rate or number of photons per second per keV detected by a radiation detector monitoring the output of the x-ray generator. Trace 1206 is the radiation spectrum directed to the formation surrounding the borehole. Note that there is a significant portion of energy at or above 250 kV, the desired range. Energy at the lower end of this spectrum has been attenuated. This is accomplished in one embodiment by the passing of the radiation through different materials before exiting the tool and entering the formation. Specifically, the Au target may be made somewhat thicker than required to create the radiation thus attenuating the signal. This radiation signal may also be passed through a copper (Cu) plate that operates as a high pass filter. Finally, the radiation must pass through a titanium or stainless steel window. All of these function to filter out the low energy radiation that is not desired.

As mentioned above, the output of a reference detector may be used to control the acceleration voltage and beam current of the x-ray generator to provide the desired stability. In order to provide the control, the reference detector must monitor radiation from the x-ray generator that has not passed through the formation. The radiation monitored by the reference detector must be filtered or otherwise altered to have a dual peak spectrum in order to provide the necessary information for controlling acceleration voltage and beam current. In one embodiment, the radiation from the x-ray generator, shown in FIG. 12 is passed through a lead (Pb) filter to produce the spectrum shown in FIG. 13. Although a lead filter is used, any high-Z (high atomic number) material that both creates the dual peak spectrum and decreases the overall radiation flux to make it feasible to measure it with the reference detector.

Figure 13:
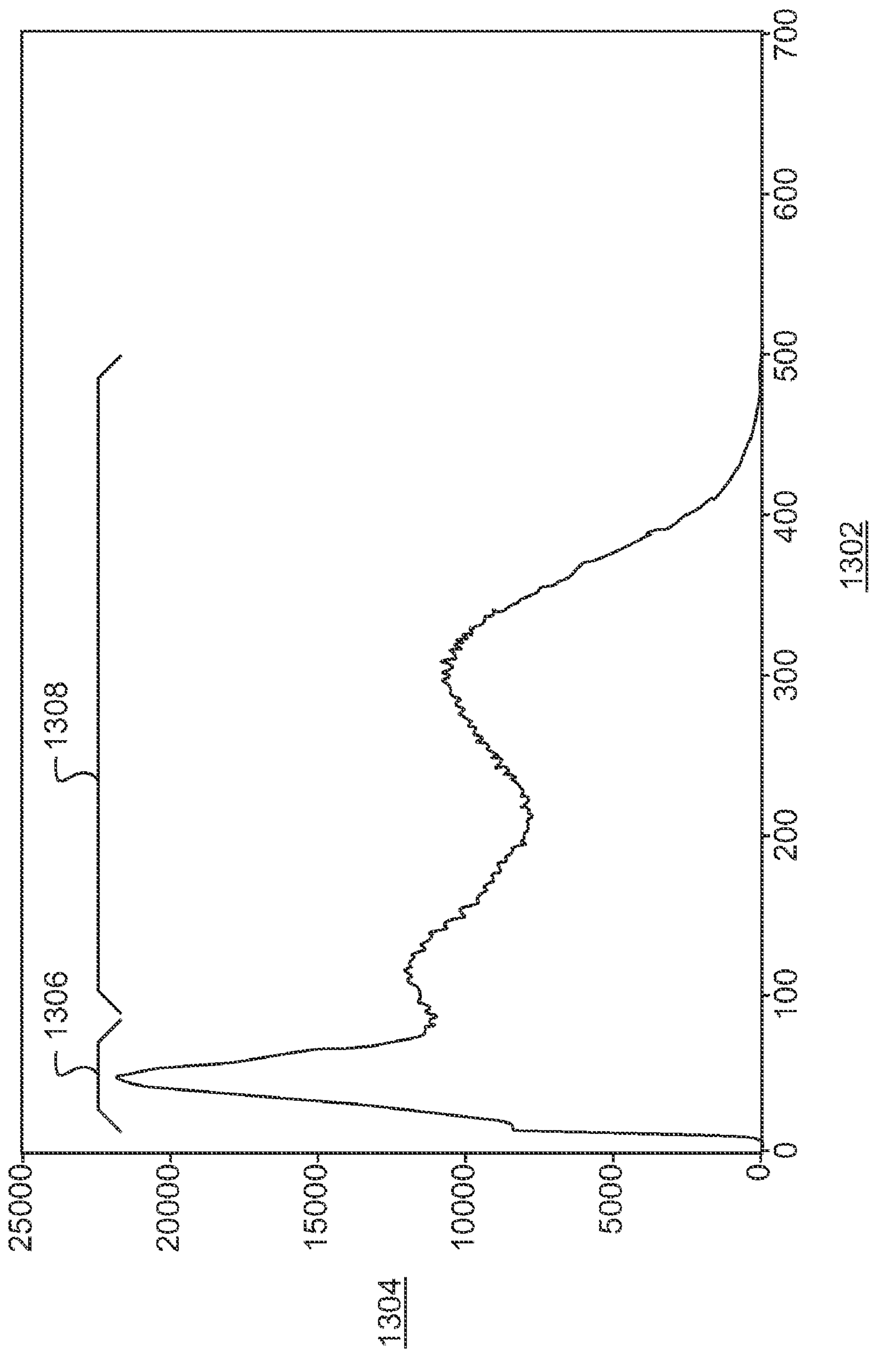
FIG. 13 is a graphical representation of a filtered spectrum produced in one embodiment of the instant invention.

In FIG. 13, abscissa 1302 is the energy of the radiation and ordinate 1304 is the count rate or the number of photons per second per keV. Two energy windows are monitored and the total counts in each window are tabulated. Region 1306 is the low energy window and region 1308 is the high energy window. The reference radiation detector bins the radiation into these two windows. The high energy count rate is referred to as $I_{R_H}$ while the low energy count rate is referred to as $I_{R_L}$.

As mentioned above, in one embodiment, the counts rates at the reference radiation detector are used to control the acceleration voltage and beam current of the x-ray generator. This is necessary because any x-ray generator is subject to electrical fluctuations that could cause error in the resultant density calculation. The $I_{R_H}$ and $I_{R_L}$ are both proportional to the number of electrons hitting the target at any given time. Additionally, the ratio of $$\frac{I_{R_H}}{I_{R_L}}$$

is proportional to the acceleration voltage of the x-ray generator $V_{x\text{-}ray}$. Looking at FIG. 13, if the voltage of the x-ray generator decreased over time, the spectrum would shift somewhat to the left. This would cause less photon counts to be placed in the high energy window and thus the ratio $$\frac{I_{R_H}}{I_{R_L}}$$

would decrease. This embodiment avoids this problem by monitoring this ratio, possibly downhole in an analysis unit included with the tool, and altering the acceleration voltage of the x-ray generator to maintain a constant $$\frac{I_{R_H}}{I_{R_L}}$$

ratio.

In addition, it is important to carefully control the beam current output by the x-ray generator. This can also be controlled using the reference detector. The reference detector counts the number of incident photons in the high energy region and low energy region. The output of the reference detector can be used by either monitoring one of these count rates or the sum of the two count rate. The output of the reference detector is used to control the x-ray generator and ensure a constant beam current.

Figure 14:
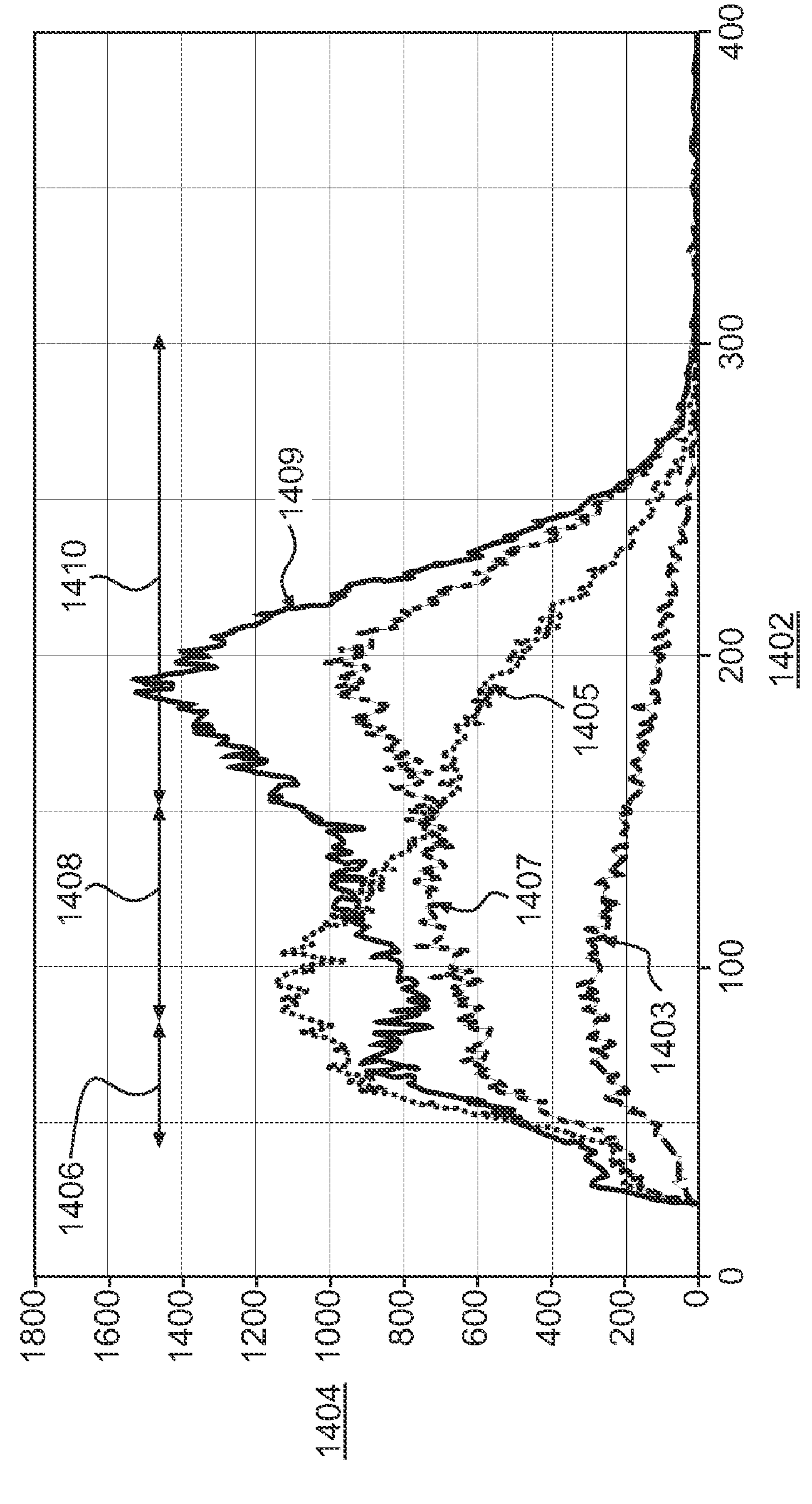
FIG. 14 is a graphical representation of an example spectrum measured by the detectors divided for analysis.

FIG. 14 is a graphical representation of the radiation monitored at the short spaced and long spaced radiation detectors for a set of control materials, aluminum (Al) and magnesium (Mg). These materials are chosen as a control because they have very different densities and can be used in calibration of the tool. Abscissa 1402 represents energy in keV while ordinate 1404 represents the count rate (counts/sec/keV). Specifically, trace 1403 represent the log spaced detector response to Al, trace 1407 represents the short spaced response to Al, trace 1405 represents the long spaced detector response to Mg, and trace 1409 represents the short spaced detector response to Mg. The three windows marked 1406, 1408, and 1410 will be referred to below in describing the analysis to account for mudcake.

Figure 15A:
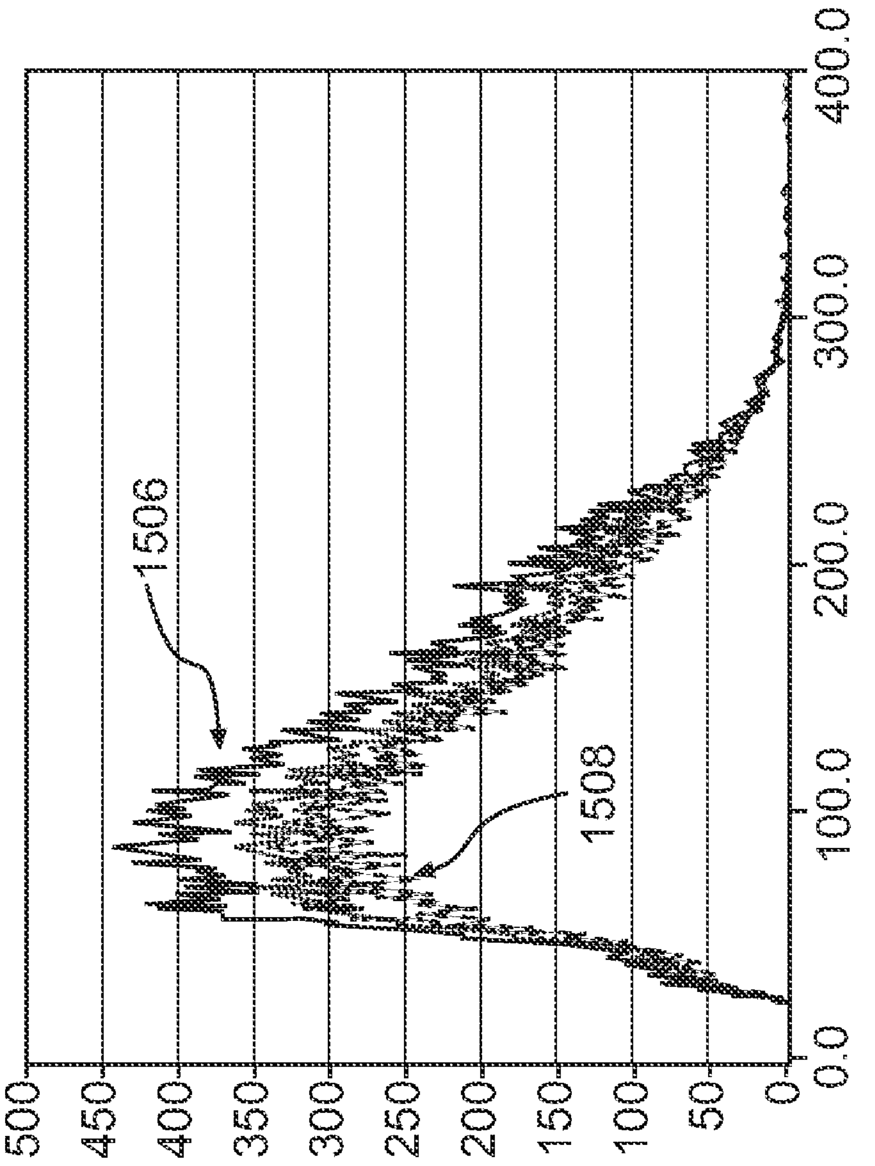
FIG. 15A is a graphical representation of the response measured at a detector with a first composition of mudcake.
Figure 15B:
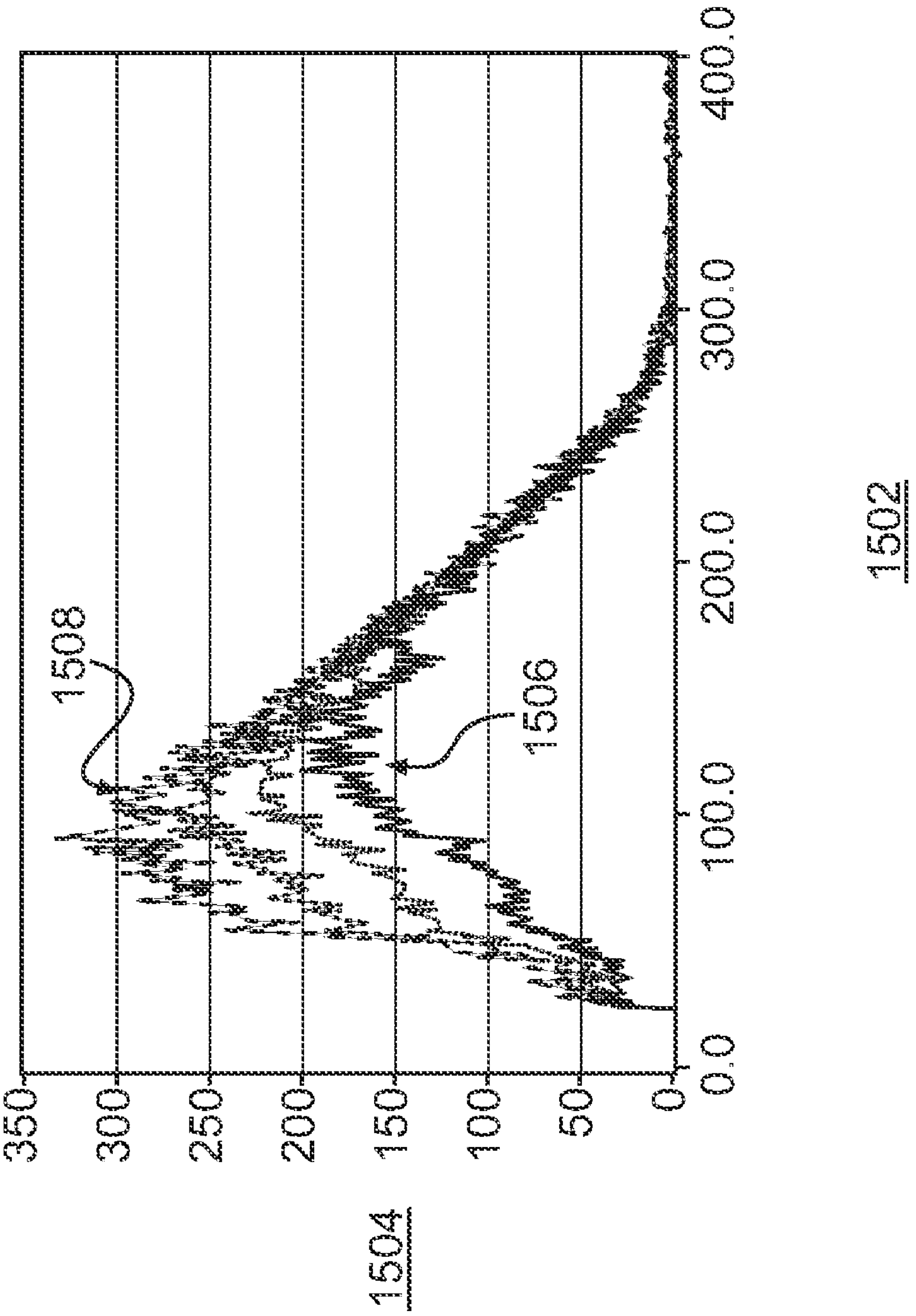
FIG. 15B is a graphical representation of the response measured at a detector with a second composition of mudcake.

FIGS. 15A and 15B show the output of a long spaced detector measuring the response from a control formation of known electron density index with different thicknesses and compositions of mudcake. Again, abscissa 1502 represents energy in keV and ordinate 1504 represents counts/sec/keV. FIG. 15A shows the response when radiation is passed into the control formation comprising different thicknesses of mudcake, the mudcake comprising no barium. Trace 1508 represents the response when no mudcake is present, trace 1506 represents the response when ½" of mudcake is present. The other two traces represent mudcake thicknesses of ⅛" and ¼". FIG. 15B shows the response when radiation is passed into the control formation comprising different thicknesses of mudcake, the mudcake comprising some amount of barium. While the two plots look similar, trace 1506, representing ½" thickness of mudcake, now provides the lowest overall response while the response 1508 with no mudcake provides the highest.

Figure 16:
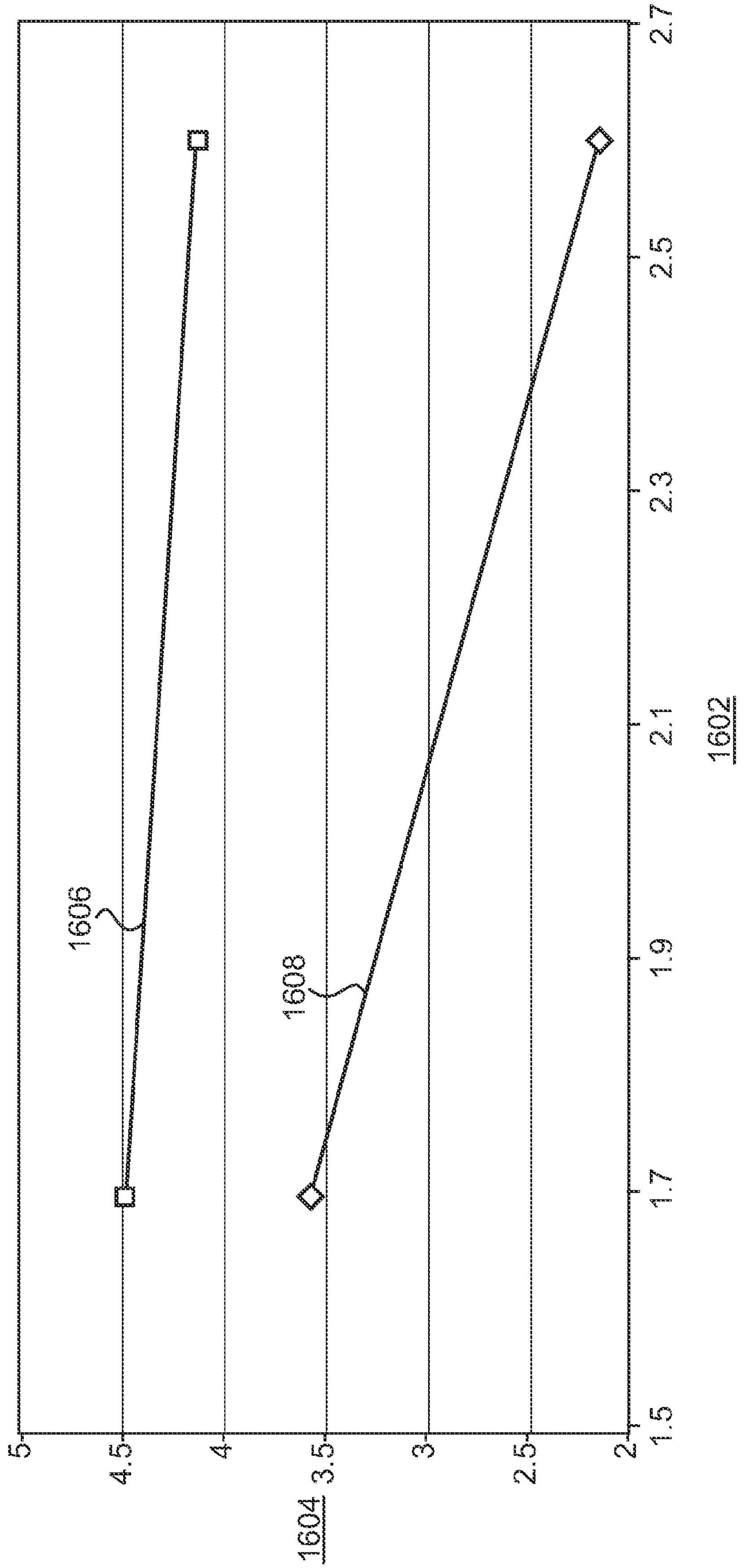
FIG. 16 is a graphical representation of the long spaced and short spaced detector density responses.

FIG. 16 shows the electron density index response of the long spaced and short spaced detector. Abscissa 1602 is the apparent electron density index as measured in gm/cc, ordinate 1604 is the natural logarithm (ln) of count rate in a given window of energies (one of the windows defined in FIG. 12.) Trace 1606 represents the short spaced detector response while trace 1608 represents the long spaced detector response. In order to resolve the actual bulk electron density index ($\rho e_b$), both the short spaced and long spaced detector outputs must be used.

The first step in calculating bulk electron density index from the counts detected at the short spaced and long spaced radiation detectors is to correct for the Z-effect. This Z-effect corrected apparent electron density index ($\rho_{eapp}$) for each of the detectors can then be used to determine the bulk electron density index of the formation accounting for the interfering mudcake. This Z-effect is due to the Photoelectric Effect in attenuation of the radiation and is encountered because the energy of the x-rays used is relatively low. Because there is proportionally larger Z-effect in the low energy than the high energy measurement, an estimate of the error due to the Z-effect in the high energy measurement can be determined by looking at the difference between the pair of attenuation measurements in two different windows.

Referring back to FIG. 14, three energy regions have been delineated. In this embodiment, window 1406 runs from approximately 40-80 keV, window 1408 runs from approximately 81-159 keV, and window 1410 runs from approximately 160-310 keV. The Z-effect in window 1408 is greater than in window 1410 and this difference can be used to correct for the Z-effect. The following equation is used to solve for the apparent electron density index $$\rho_{eapp} = -S_1 \ln\left(\frac{I(E)}{I_0(E)}\right)$$

where $S_1$ is equal to $$\frac{2Z}{d\mu_m(E)A}.$$

In practice, the same method is followed for both the short spaced and long spaced detectors. The steps of this method may be performed in any order provided that the general formulae are followed. First, the count rate for window 1408 is tabulated and normalized with the count rate determined with no mudcake present. Using the previous equation, the apparent electron density index ($\rho_{eapp,\ low}$) of this window is calculated. Second, the count rate for window 1410 is tabulated and normalized with the count rate determined with no mudcake present. Using the previous equation, the apparent electron density index ($\rho_{eapp,\ high}$) of this window is calculated.

A function is then defined to use these two values to determine a corrected apparent electron density index for window 1410. Any inversion that provides an accurate result (determined using calibration materials) can be used to determine the corrected apparent electron density index value. In one embodiment, the following equation is used $$\rho_{ls,eapp,corr,high} = 1.3\rho_{ls,eapp,high} - 0.3\rho_{ls,eapp,low}$$

for both the long spaced and short spaced detectors.

Once these values have been determined for the long spaced and short spaced detectors, the difference between them is calculated and referred to as the apparent electron density index correction available, or $\rho_{ecorr.avail.}$. Specifically, $$\rho_{ecorr.avail.} = \rho_{ls,eapp,corr,high} - \rho_{ss,eapp,corr,high}.$$

Using a variety of materials of known density, a graph is produced that plots a number of correction available values against the following value $$\rho_{eb} - \rho_{ls,eapp,corr,high}$$

where $\rho_{eb}$ is the electron density index of the known material.

This plot provides all the information that is needed to calculate the electron density index of an unknown material, such as the formation surrounding a borehole, from the corrected apparent electron density indexes determined by a long spaced and short spaced detector. Once the $\rho_{ecorr.avail.}$ is determined, this is compared to the plot just discussed, this provides the value of the previous equation which is easily solved to provide the electron density index of the formation in question. This analysis can take place downhole as part of an analysis unit in the tool or above ground if the outputs of all radiation detectors are passed up the wireline to an above ground analysis unit.

The conversion of the formation electron density index determined above to the formation mass density requires a transformation equation. Typically the equation that is used to convert the formation electron density index, $\rho_{eb}$, into a mass density, $\rho$, is the following:

$$\rho = 1.0704 \cdot \rho_{eb} - 0.188$$

The formation mass density is usually the quantity of interest for downhole measurements.

The preceding description has been presented only to illustrate and describe the invention and some examples of its implementation. It is not intended to be exhaustive or to limit the invention to any precise form disclosed. Many modifications and variations are possible and would be envisioned by one of ordinary skill in the art in light of the above description and drawings.

The various aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims; however, it is not intended that any order be presumed by the sequence of steps recited in the method claims unless a specific order is directly recited.

What is claimed:

1. A compact x-ray generator comprising:

an electron emitter;

a target;

a high voltage power supply; wherein said x-ray generator provides radiation with energy greater than or equal to 250 keV; and said x-ray generator operates at temperatures greater than or equal to 125° C.; and a filter to attenuate radiation from the target below 250 keV.

2. The compact x-ray generator as defined in claim 1 wherein the filter comprises a thickness of the target selected to attenuate emission of radiation below 250 keV.

3. The compact x-ray generator as defined in claim 1 wherein the filter comprises a copper window disposed in a radiation path from the target in a tube enclosing the electron emitter and the target.

4. The compact x-ray generator as defined in claim 1 wherein said high voltage power supply comprises:

a first high voltage power supply configured to apply a first voltage to said electron emitter; and a second high voltage power supply configured to apply a second voltage to said target, wherein said first high voltage is a negative voltage and said second high voltage is a positive voltage.

5. The compact x-ray generator as defined in claim 4, wherein:

at least one of said first high voltage power supply and said second high voltage power supply is a Cockcroft-Walton type voltage generator.

6. The compact x-ray generator as defined in claim 4, wherein:

the difference between said first high voltage and said second high voltage is at least 250 kV.

7. The compact x-ray generator as defined in claim 4, wherein:

at least one of said first high voltage power supply and said second high voltage power supply is configured to fold in order to decrease the size of the x-ray generator.

8. The compact x-ray generator as defined in claim 1, further comprising an angled window disposed externally to the target and configured to direct x-rays generated by the generator in a predetermined direction toward a rock formation disposed outside the generator.

9. The compact x-ray generator of claim 8, wherein the window is formed in a shield disposed externally to the generator and having atomic number sufficient to substantially shield x-rays emitted by the generator.

10. A method for generating x-rays for density and photoelectric well logging, comprising:

accelerating electrons toward a target at a voltage difference between an emitter and the target of at least 250 keV;

filtering x-rays emitted by the target to attenuate x-rays below an energy level of 250 keV; and directing the filtered x-rays toward a rock formation outside a wellbore.

11. The method of claim 10 wherein the filtering comprises selecting a thickness of the target to cause attenuation of x-rays having energy below 250 keV.

12. The method of claim 10 wherein the filtering comprises causing the x-rays emitted by the target to pass through a copper plate during the direction toward the rock formation.

13. The method of claim 10 further comprising directing x-rays generated by the generator in a predetermined direction toward a rock formation disposed outside the generator.

* * * * *